US006379779B1

(12) United States Patent
Mürl

(10) Patent No.: US 6,379,779 B1
(45) Date of Patent: Apr. 30, 2002

(54) PRINTING INK FOR SAFE MARKING ON A DATA CARRIER

(75) Inventor: Gerhard Mürl, Wasserburg/Inn (DE)

(73) Assignee: Giesecke & Devrient GmbH, Munich (DE)

(*) Notice: Subject to any disclaimer, the term of this patent is extended or adjusted under 35 U.S.C. 154(b) by 0 days.

(21) Appl. No.: 09/319,911

(22) PCT Filed: Dec. 12, 1997

(86) PCT No.: PCT/EP97/07009

§ 371 Date: Aug. 10, 1999

§ 102(e) Date: Aug. 10, 1999

(87) PCT Pub. No.: WO98/28374

PCT Pub. Date: Jul. 2, 1998

(30) Foreign Application Priority Data

Dec. 20, 1996 (DE) .......................................... 196 53 423

(51) Int. Cl.[7] .................................................. B32B 3/00
(52) U.S. Cl. .................. 428/195; 428/206; 428/207; 428/212; 428/408; 428/690; 428/916; 106/31.13; 106/31.32; 101/DIG. 29

(58) Field of Search ................................. 428/42.1, 206, 428/207, 402, 913, 403, 408, 409, 916, 690, 195, 212, 367; 106/31.13, 31.01, 31.64, 31.32; 156/277; 101/DIG. 29; 263/88, 94

(56) References Cited

U.S. PATENT DOCUMENTS

| 2,265,419 A | * 12/1941 | Brand et al. |
| 2,823,146 A | * 2/1958 | Roberts et al. |
| 4,869,532 A | 9/1989 | Abe et al. |
| 5,366,252 A | 11/1994 | Nishida et al. |
| 5,629,068 A | 5/1997 | Miekka et al. |

FOREIGN PATENT DOCUMENTS

GB        1 534 403        12/1978

* cited by examiner

Primary Examiner—Deborah Jones
Assistant Examiner—Abraham Bahta
(74) Attorney, Agent, or Firm—Bacon & Thomas

(57) ABSTRACT

The application relates to a printing ink with an IR-absorbent additive to be applied for protection of documents and for machine detection. It is proposed that graphite be used as the IR-absorbent additive.

20 Claims, 1 Drawing Sheet

PRINTING INK FOR SAFE MARKING ON A DATA CARRIER

This invention relates to a printing ink with an IR-absorbent additive, a semifinished product for producing it and a document printed with said ink.

Data carriers, such as documents, in particular documents of value, such as identification cards, airplane tickets, passports, bank notes, papers of value or the like, and other objects of value are provided with security features for protection against forgery or falsification. Two groups of security features are essentially distinguished, the first group including so-called "human features" designed so that the authenticity of the documents or objects of value can be recognized by mere sensory perception. This group includes in particular providing optically variable inks on the documents or objects of value and applying holograms.

In a second group including so-called "machine features," features are assigned to the documents of value which can usually be detected by machine, i.e. only with the aid of sensors. In the paper-of-value field, in particular magnetically or electrically detectable features have become established. Moreover, optically recognizable markings of security documents are also known whereby the wavelength with which the sensor can detect the marking is outside the visually perceptible spectral region, e.g. in the infrared (IR).

With the sensors commonly used today one detects such an IR-absorbent marking by illuminating the document with an IR-emitting light source and measuring the diffuse reflection, i.e. the light of the irradiation wavelength emitted by the document or marking by reason of this illumination. A document or printed marking is deemed IR-absorbent if it falls below a certain, fixed diffuse reflection value. A threshold as of which a document or marking is deemed IR-absorbent can be fixed as a diffuse reflection value of 50% for example.

In order to reach or fall below the aforementioned diffuse reflection values, a document must have a certain quantity of IR-absorbent additive, e.g. in one of its printing inks.

For marking data carriers GB 1 534 403 discloses a security document printed with two inks appearing identical in the visible spectral region but differing in their infrared-absorbent behavior. For this purpose carbon black is added to a pigmented ink as an IRI-absorbent additive for example. However the addition of carbon black to inks makes them appear darker or "dirtier," while it is necessary to add so much carbon black to the ink for sufficient marking thereof that darkening or "dirtying" of the ink is unavoidable with the use of carbon black as an IR-absorbent additive, and the ink is substantially impaired in its visible color effect. The direct result is that only a very limited color range of IR-absorbent inks can be produced, this color range including substantially the so-called "dirty brown" tones.

In order to avoid this disadvantage EP 0 553 614 A1 has proposed using so-called phthalocyanines, which are substantially transparent or hardly visible, rather than carbon black as an IR-absorbent additive. However these phthalocyanines have the disadvantage that they must be produced by a complex chemical process.

The problem of the present invention is accordingly to propose a printing ink having an IR-absorbent additive which is inexpensive and readily available and has only little influence on the ink in the optical spectral region.

The invention is based on the finding that carbon black and graphite particles, which are both built up from elementary carbon, have almost the same color effect in the visible spectral region. Moreover, measurements in the IR show that the two kinds of particles hardly differ in their absorbent behavior in the IR. However it has surprisingly turned out that the visual influence of an ink by the addition of graphite to this ink is clearly lower than the influence resulting from addition of the same quantity of carbon black. In consideration of the fact that an increase in the quantity of IR-absorbent additive leads directly to increased IR absorption of the ink, this finding means that much more graphite can be added for a given tone than would be possible using carbon black as an IR-absorbent additive, so that by using graphite as an IR-absorbent additive one can produce considerably higher IR absorption for a given tone than using carbon black.

The tones to be provided on a document are usually given and contain no IR-absorbent additives. If this tone is to be produced at least partly with IR-absorbent properties, the inventive additive makes it possible to adjust this given tone by developing a new ink formulation containing the inventive IR-absorbent additive in percentages by weight of less than 7%, but preferably less than 5%, based on the total weight of the ink. In a particularly preferred embodiment the inventive ink contains less than 3 wt % of the additive. By adding graphite in the stated percentages one can produce inks having an IR diffuse reflection of less than 50% and therefore deemed IR-absorbent for the sensor used.

Although it is fundamentally possible to produce the IR-absorbent ink by adding graphite powder to an ink directly in the desired quantity, it has proved advantageous first to produce a "paste" as a semifinished product in which the graphite powder is already mixed homogeneously in a binder. For producing this paste one mixes or disperses the graphite powder for example together with a binder-containing transparent or opaque white color and a thinner in a mixer or dispersing apparatus until a paste arises in which the graphite powder is distributed homogeneously. According to another method the graphite powder can also be processed into a homogeneous paste by mixture or dispersion directly in a suitable binder, optionally with the addition of solvent.

The paste containing IR-absorbent graphite can be used directly for producing IR-absorbent ink or stored for later use. In production of the ink the desired proportions of paste are mixed with a basic color and optionally further proportions of transparent or opaque white color so as to yield the IR-absorbent ink.

The thus produced ink can be used for printing documents or other objects of value in order to provide them with an IR-absorbent feature substance.

Further advantages and advantageous embodiments of the invention will be stated with reference to the following description of the figures, in which.

Figure 1:
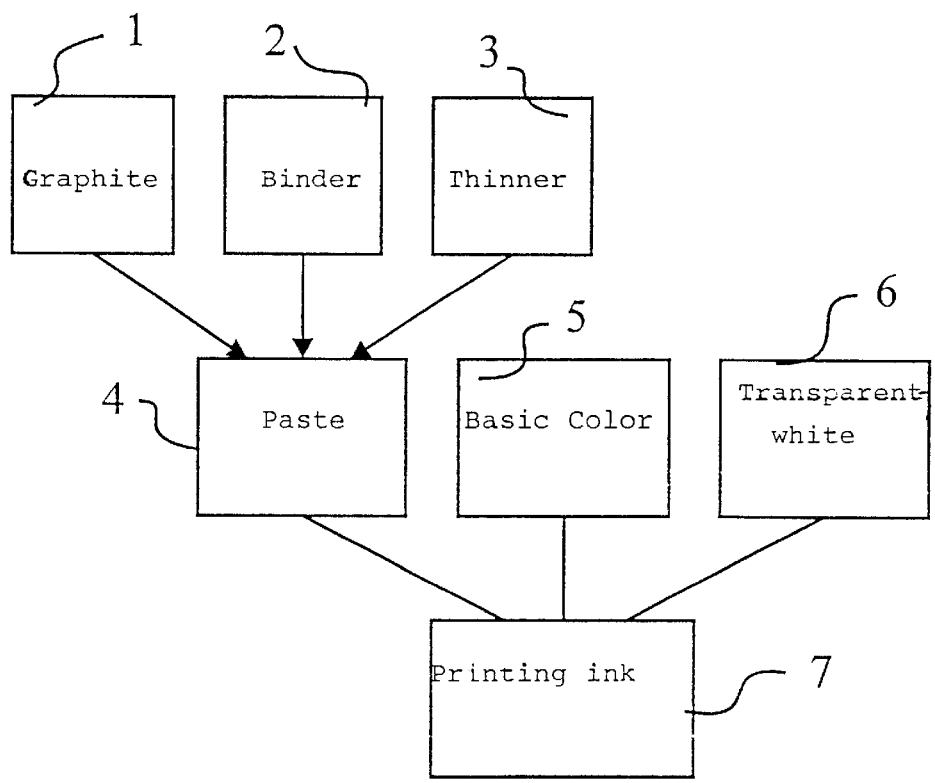
FIG. 1 shows the schematized production of an inventive ink.

FIG. 1 shows a schematic diagram of the procedure for producing the inventive ink. In a first method step one starts out from graphite powder 1 and binder 2, present for example in an opaque or transparent white color, and thinner 3 to produce paste 4 serving as the starting material for producing the ink. For producing the paste one mixes the initial substances together in a mixer until the graphite powder is distributed homogeneously in the paste in the desired quantity. One is basically free in selecting the quantity of added graphite when producing the paste, but graphite powder is advantageously added in a quantity of 5 to 30 wt %, thinner in a quantity of 0 to 20 wt % and binder in a quantity of 60 to 90 wt %.

Only in a second method step does one produce the ink for printing the document, starting out from paste 4 and further additives. The suitable proportion of paste 4 is mixed with basic color 5 and optionally opaque or transparent white color 6 until homogeneous ink 7 arises which now has the desired IR-absorbent properties. The proportions of paste 4, basic color 5 and opaque or transparent white color 6 can vary depending on the application and color. However paste 4 is usually added in a ratio ensuring that the percentage of IR absorber is smaller than 7% based on the total weight of the resulting ink.

The procedure for producing the inventive ink will be explained again in the following by specific examples.

For producing a first paste one mixes the ingredients 7.5% graphite powder

10% thinner 82.5% transparent or opaque white color in a mixer until the graphite powder is distributed homogeneously in the mixture and a paste arises.

The paste is then used for producing the inventive ink, whereby 240 g basic color, red or orange 30 g transparent white color 30 g of the aforementioned 7.5% graphite paste are mixed until a homogeneous mixture arises which conveys a weak dirty red or weak dirty orange color effect.

For producing a second paste one mixes the ingredients 25 to 30% graphite powder 70 to 75% varnish in a mixer until the graphite powder is distributed homogeneously in the mixture a paste arises.

This paste is then used for producing the inventive ink, whereby e.g. 220 g basic color, red or orange 50 g transparent white color 50 g of the aforementioned 25 to 30% graphite paste are mixed until a homogeneous mixture results which conveys a weak dirty red or weak dirty orange color effect.

One of the above mentioned IR-absorbent inks is applied to a data carrier, together or one after the other, with an ink of the same tone which is non-IR-absorbent. The non-IR-absorbent ink is mixed starting out from the same basic color, red or orange, with the aid of a so-called "IR transparent black" until the same tone arises as the IR-absorbent ink used has.

Along with the basic colors, red and orange, stated in the examples one can of course also use other colors as basic colors.

Figure 2:
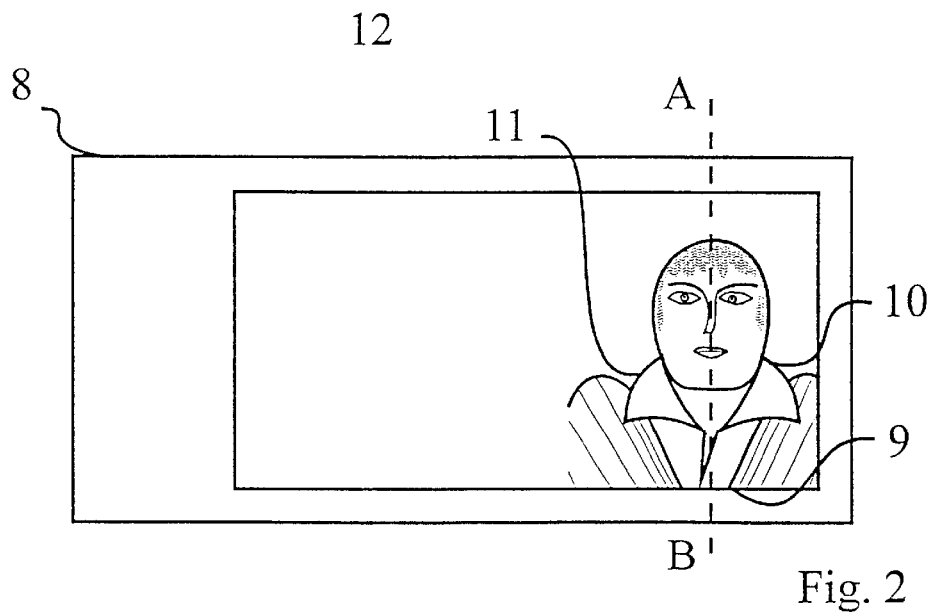
FIG. 2 shows a document of value provided with the inventive ink.

FIG. 2 shows document of value 8, in this case a bank note, which has been provided with a feature invisible to the human eye but machine readable with the aid of the inventive ink. For this purpose portrait 9 applied by intaglio printing is divided into two port ions 10 and 11, portion 10 of the portrait being printed n a non-IR-absorbent ink and portion 11 in an infrared-absorbent ink without any difference between the two inks being recognizable in the visible spectral region. The separating line of the portions is indicated by the dashed line extending from A to B. Using a suitable sensor, the authenticity of the bank note can be recognized by the testing machine ascertaining that portion 11 absorbs in the infrared.

There are a great number of further possibilities of using the inventive ink a one or together with an ink having the same tone but not absorbent in the infrared for marking data carriers, in particular documents, or protecting them from forgery or falsification. For example it is possible to apply the non-IR-absorbent ink over the surface as a background print and apply the IR-absorbent ink in a pattern thereabove so that no marking can be recognized visually. Only with the aid of an IR sensor can the pattern of IR-absorbent ink be recognized against the background of the non-absorbent ink. Suitable patterns are in particular bar codes, value-specific representations, texts, characters, patterns or pictures which can then be evaluated with the aid of a suitable evaluation unit to prove the authenticity of the document.

It is of course also possible to apply an IR-absorbent ink in the form of an aforementioned pattern to a partial area of the data carrier and cover only the surface areas not filled by the pattern of IR-absorbent ink with non-IR-absorbent ink, so that no pattern is again recognizable in the visually recognizable spectral region while the pattern can be clearly detected in the infrared.

Suitable printing processes are all common printing processes such as steel intaglio printing, offset printing, transfer printing, flexography, alone or in combination with each other.

What is claimed is:

1. A printing ink for use as a security marking on a data carrier comprising a colorant and an infrared-absorbent additive and whose visually perceptible color effect is given substantially by the colorant, said infrared-absorbent additive comprising graphite.

2. The printing ink of claim 1, wherein the graphite is present in the ink in a quantity of less than 7 wt %, based on the total weight of the ink.

3. A semifinished product for producing the printing ink of claim 1 said product including an infrared-absorbent additive, wherein said infrared-absorbent additive comprises graphite.

4. The semifinished product of claim 3, wherein the percentage by weight of graphite in the semifinished product is less than 30%.

5. A data carrier comprising a marking printed with a printing ink containing a colorant and an infrared-absorbent additive and whose visually perceptible color effect is given substantially by the colorant, wherein the infrared-absorbent additive comprises graphite.

6. The data carrier of claim 5, wherein the infrared-absorbent ink is printed in a pattern, selected from the pattern group consisting of a picture, logo, binary code and alphanumeric character.

7. The data carrier of claim 5, wherein the graphite is present in the infrared-absorbent ink in a proportion less than 7%, wt %, based on the total weight of the ink.

8. The data carrier of claim 5, wherein, in addition to the infrared-absorbent ink the data carrier has imprinted thereon a further ink which is not infrared-absorbent and has the same tone as the infrared-absorbent ink.

9. The data carrier of claim 8, wherein the infrared-absorbent ink and non-infrared-absorbent ink are superimposed at least in certain areas.

10. The data carrier of claim 8, wherein the non-infrared-absorbent ink is present only in areas not covered by the infrared-absorbent ink.

11. A method for producing an infrared-absorbent printing ink containing a colorant, comprising the steps of:

providing a basic ink containing colorant, providing a paste containing binder and graphite, mixing the basic ink with the paste.

12. The data carrier of claim 5 wherein the graphite is present in the infrared-absorbent ink in a proportion of less than 5 wt %, based on the total weight of the ink.

13. The data carrier of claim 5 wherein the graphite is present in the infrared-absorbent ink in a proportion of less than 3 based on the total weight of the ink.

14. The printing ink of claim 1, wherein the graphite is present in the ink in a quantity of less than 5 wt %, based on the total weight of the ink.

15. The printing ink of claim 1, wherein the graphite is present in the ink in a quantity of less than 3 wt %, based on the total weight of the ink.

16. The semifinished product of claim 3, wherein the percentage by weight of graphite in the semifinished product is less than 10%.

17. The printing ink of claim 1, wherein the colorant is a color pigment in the visible spectrum.

18. The data carrier of claim 5, wherein the colorant is a color pigment in the visible spectrum.

19. The data carrier of claim 8, wherein the colorant is a red or orange colored pigment.

20. The method of claim 11, wherein the colorant is a color pigment in the visible region of the spectrum.

* * * * *